(12) United States Patent
Rice et al.

(10) Patent No.: US 6,687,100 B1
(45) Date of Patent: Feb. 3, 2004

(54) METHOD OF DISSIPATING ENERGY FROM A CONTACTOR COIL

(75) Inventors: Julius Isaiah Rice, Raleigh, NC (US); Roger Alan Plemmons, Knightdale, NC (US)

(73) Assignee: Square D Company, Palatine, IL (US)

( * ) Notice: Subject to any disclaimer, the term of this patent is extended or adjusted under 35 U.S.C. 154(b) by 0 days.

(21) Appl. No.: 09/475,584

(22) Filed: Dec. 30, 1999

(51) Int. Cl.[7] .................................................. H02H 3/00
(52) U.S. Cl. ......................................... 361/4; 361/169.1
(58) Field of Search ...................... 361/4, 168.1, 169.1, 361/191

(56) References Cited

U.S. PATENT DOCUMENTS

| | | | | |
|---|---|---|---|---|
| 3,840,831 A | * | 10/1974 | Guichard | 335/152 |
| 4,227,231 A | * | 10/1980 | Hansen et al. | 361/154 |
| 4,250,531 A | * | 2/1981 | Ahrens | 361/2 |
| 5,327,055 A | * | 7/1994 | Danielson et al. | 318/366 |
| 5,517,378 A | * | 5/1996 | Asplund et al. | 361/4 |
| 5,652,688 A | * | 7/1997 | Lee | 361/13 |

OTHER PUBLICATIONS

Full Voltage Contactors—NEMA Rated, pp. 12–12, 12–13; "Digest;" Oct., 1997; Square D.
3–Pole Non–Reversing Contactors, AC or DC Operating Coil; p. 14–2l;"Digest;" Oct., 1997; Square D.
2– and 4– Pole Non–Reversing Contactors, AC or DC Operating Coil; p. 14–3; "Digest;" Oct., 1997; Square D.

* cited by examiner

Primary Examiner—Gregory J. Toatley, Jr.
Assistant Examiner—Zeev Kitov
(74) Attorney, Agent, or Firm—David R. Stacey; Larry T. Shrout; Larry I. Golden

(57) ABSTRACT

A method of rapidly dissipating energy from a contactor controlled by a switching device, the steps comprising: operably connecting a metal oxide varistor to the switching device; interrupting electrical current to the contactor; absorbing energy from the contactor; and, limiting the amount of voltage across the switching device.

19 Claims, 4 Drawing Sheets

METHOD OF DISSIPATING ENERGY FROM A CONTACTOR COIL

TECHNICAL FIELD

The present invention generally relates to contactor circuits. More specifically, to rapidly dissipating energy from an energized contactor coil.

BACKGROUND OF THE INVENTION

Electronic coil designs may utilize a dual wound DC coil that pulls an armature into the picked up, i.e., closed, position and holds the armature in the closed position. The first coil is called the pickup, or inrush coil. It is a low impedance, high current coil that generates the large amount of flux, NI, necessary to pull the armature in from the dropped out, i.e., open, position. The large amount of wattage that the pickup coil generates can thermally damage the electronic coil assembly if the pickup coil were allowed to remain on continuously. It is the primary job of the contactor's electronic circuit to turn the pickup coil on until the armature is fully pulled in, and then to turn the pickup coil off. The pickup coil has a large L/R ratio, or time constant, due to the many turns of wire and small impedance of the coil.

The second coil or holding coil, is a high impedance, low current coil that generates the smaller amount of flux necessary to hold the armature in the closed position once the pickup coil is de-energized. The holding coil typically incorporates a smaller gauge wire than used in the pickup coil. The smaller wire provides a higher resistance value than present in the pickup coil. Therefore, the holding coil has a smaller L/R ratio and time constant than the pickup coil.

Dropout or opening of the contactor's armature during normal operation is typically accomplished by interrupting the power supply to the coil circuit and allowing the energy within the holding coil to naturally decay through the holding coil's impedance. In large contactors, the amount of energy required to decay before the contactor dropouts can be rather large. Since the impedance of a large contactor can be small, it may take a long time, i.e., hundreds of milliseconds, for the energy within the coil to decay before the contactor dropouts.

Another mode of operation for the contactor is called jogging. Jogging occurs when the contactor is picked up for a very short duration and then dropped out again. The jogging cycle may be repeated many times over a brief period. Jogging is often used in positioning booms or heavy duty cranes. Due to the fact that the pickup coil has a long time constant, the pickup coil may still be energized during repeated attempts to interrupt the power supplied to the pickup coil. The failure to sufficiently dissipate the energy stored in the contactor's coil will interfere with the jogging operation. Therefore, the energy stored in the pickup coil must be dissipated rapidly to force a fast dropout so as not to interfere with the jogging operation and to ensure accurate movement of apparatuses controlled by the contactor circuit.

Electrical components such as Zener diodes, gas tubes or capacitors have been frequently used to repetitively dissipate the energy from electrical components. The problem with using diodes and capacitors to dissipate contactor coils is the amount of energy stored in the coil relative to the dissipation capability of the diode or capacitor. For instance, a capacitor having the proper voltage handling capability and sufficient capacitance to dissipate the energy of the pickup coil would need to be very large. With physical space of the printed circuit board at a premium, a physically large capacitor would not be acceptable. Zener diodes may work on small contactors, but Zener diodes capable of working at greater than 100V are limited. Finding a Zener diode with the ability to dissipate many amperes is virtually impossible unless the Zener diode is so physically large that it would be impractical to use on a small printed circuit board. Gas tubes exhibit follow currents and are not the best candidate for this application.

Prior to the present invention, a need existed to rapidly and repetitively dissipate the stored energy in the coil of a contactor after the contactor has been commanded to dropout. Furthermore, the method used should be less costly to existing procedures and adaptable for use in smaller sized circuits.

This invention is designed to resolve these and other problems.

SUMMARY OF THE INVENTION

A metal oxide varistor (MOV) is capable of rapidly absorbing energy from a coil of a dropped out contactor. Typically, MOVs have been used in "one shot" or single use applications such as power surge protection circuits. However, MOVs are capable of being implemented in repetitive applications requiring rapid power dissipation such as in the jogging operation of a contactor. Moreover, the ratio of physical size to dissipating capability of the MOV and its relative inexpensiveness as compared to other "similar" dissipating techniques, qualify the MOV as an excellent choice for use in rapidly dissipating contactor coils.

Accordingly, the first embodiment of the present invention is directed to a method of dissipating energy from a contactor controlled by a switching device, the steps include: operably connecting a metal oxide varistor to the switching device; interrupting electrical current to the contactor; absorbing energy from the contactor; and, limiting the amount of voltage across the switching device.

Another embodiment of the present invention is directed to a method of dissipating energy from a dual wound coil controlled by a switching device, the steps include operably connecting a metal oxide varistor to the switching device; interrupting electrical current to the pickup coil of the dual wound coil; absorbing energy from the pickup coil; and, limiting the amount of voltage across the switching device.

A further aspect of the embodiments above includes an insulated gate bipolar transistor (IGBT) for the switching device.

Other advantages and aspects of the present invention will become apparent upon reading the following description of the drawings and detailed description of the invention.

DETAILED DESCRIPTION OF THE PREFERRED EMBODIMENT

Figure 1:
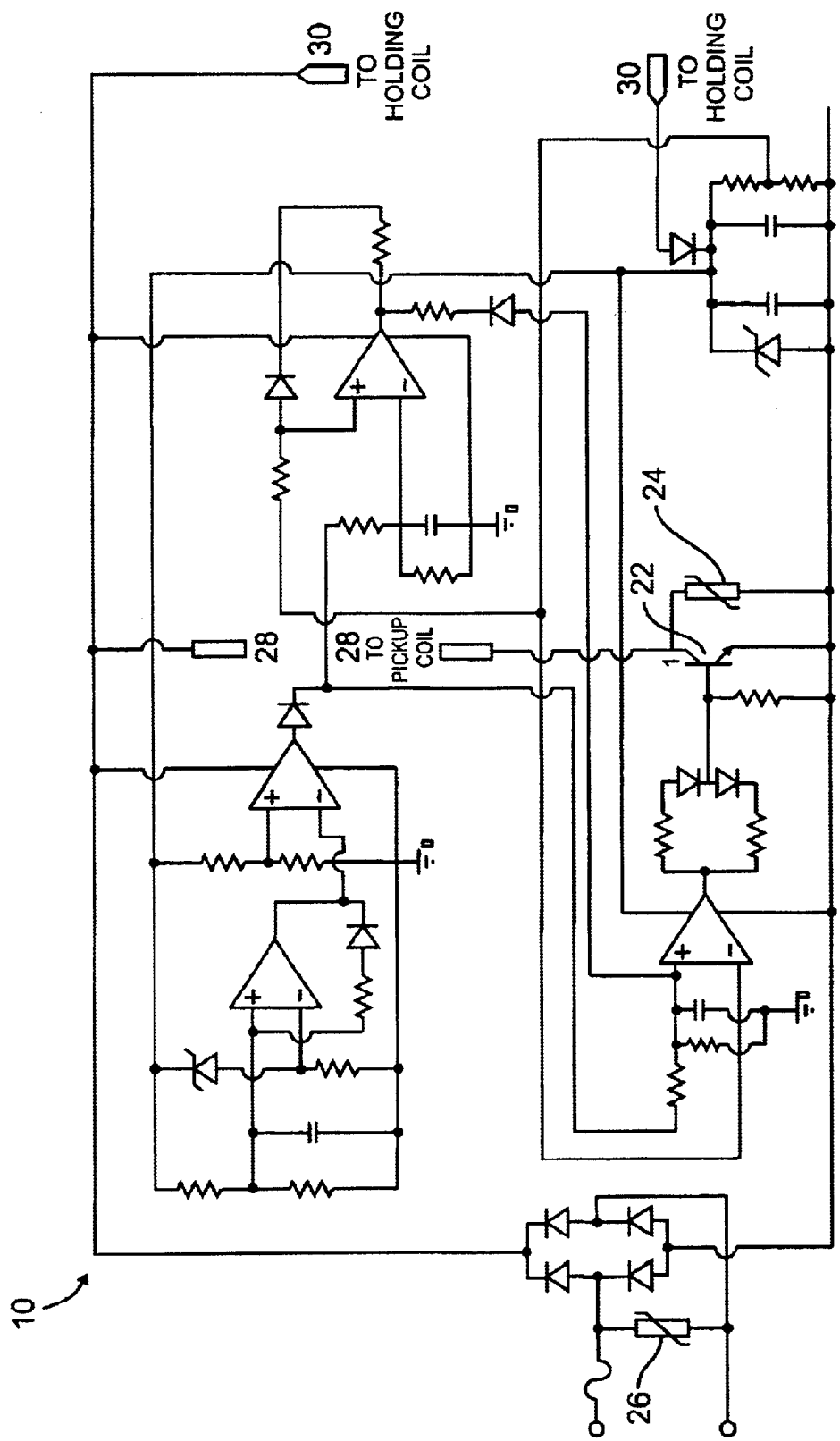
FIG. 1 is schematic diagram of a dual wound contactor circuit.

While this invention is susceptible of embodiments in many different forms, there is shown in the drawings and will herein be described in detail preferred embodiments of the invention. The present disclosure is to be considered as an exemplification of the principles of the invention and is not intended to limit the broad aspect of the invention to the embodiments illustrated.

Typically, a contactor circuit 10 contains many components and sub-circuits, such as: a power supply, a timing circuit, a gating circuit, a power supply status circuit, a switching device 22 and metal oxide varistors (MOV) 24, 26. As shown in FIG. 1, the sub-circuits and components are operably connected. The contactor circuit 10, specifically the pickup coil 28, is responsive to the output of the switching device 22.

A dual wound contactor design utilizes a pickup coil 28 and a holding coil 30. When energized, the pickup coil 28 pulls the contactor's armature into the picked up or closed position. The holding coil 30 holds the armature in the closed position after the pickup coil is energized. The pickup 28 and holding 30 coils have distinct and separate responsibilities; however, the two coils are magnetically coupled by the iron core (armature and magnet) that they share. In some aspects this causes the two coils to act like a transformer.

Figure 2:
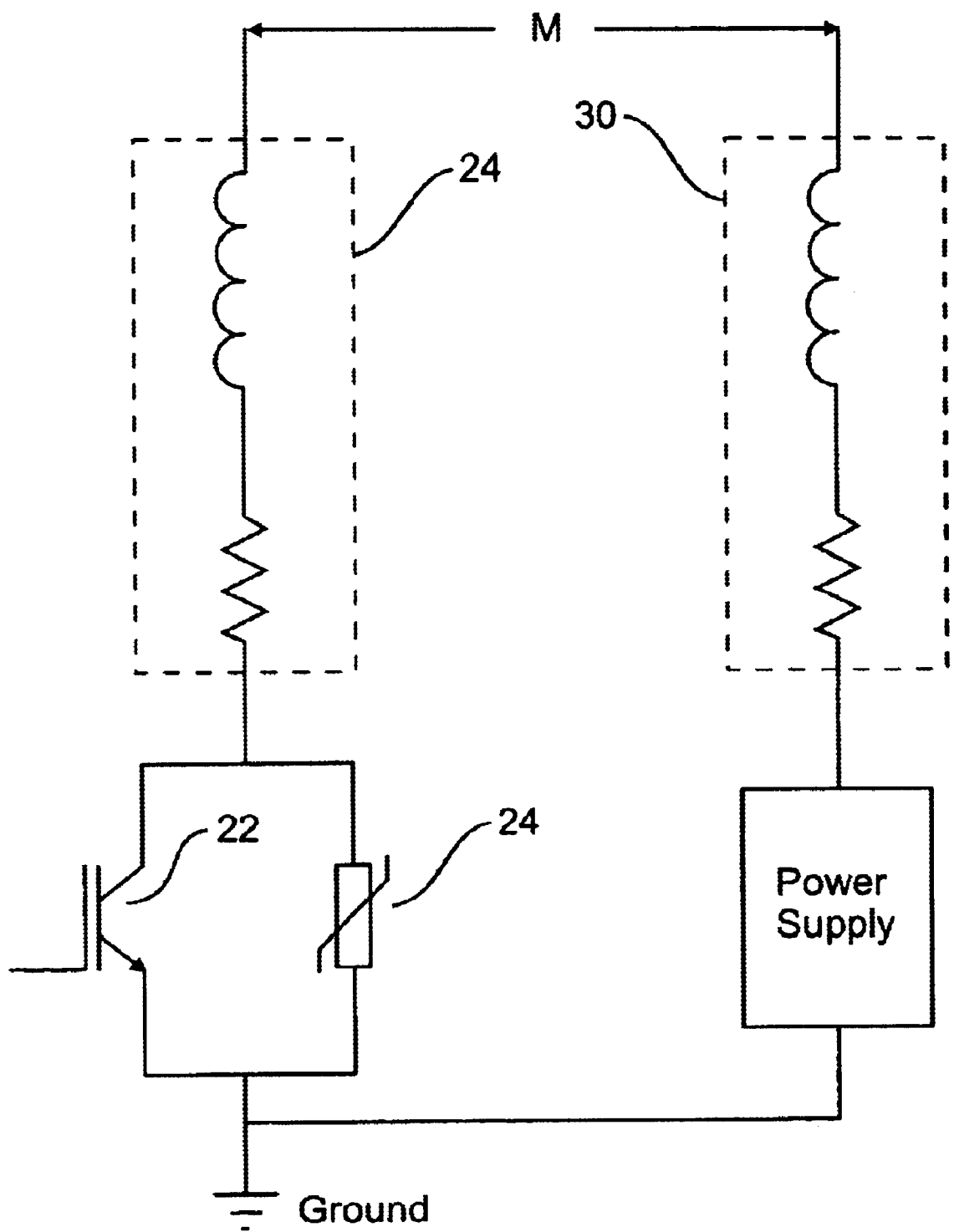
FIG. 2 is schematic diagram of switching device, preferably an IGBT, operably connected to a metal oxide varistor (MOV) and the pickup coil of a dual wound contactor.

A switching device 22, preferably an insulated gate bipolar transistor (IGBT) controls the pickup coil 28 of the contactor. When the IGBT 22 turns off and interrupts the pickup current, there is a large increase in voltage across the pickup coil 28 due to the L·di/dt that occurs. The IGBT 22 blocks the large increase in pickup coil voltage. The increase in coil voltage appears across the collector and emitter junction, $V_{CE}$, of the IGBT 22. Operably connecting an MOV 24 to the IGBT 22 clamps this voltage increase in $V_{CE}$ so that the IGBT 22 will not be destroyed. FIG. 2. The MOV 24 is placed in parallel with the IGBT 22 to protect the IGBT 22 from transient voltages as well as to absorb energy from the pickup coil 28 when the IGBT 22 turns off. The MOV 24 functions as a voltage clamp, preventing the energy dissipated from the pickup coil 28 from generating a voltage across the collector-emitter junction of the IGBT 22 that exceeds a predetermined amount.

In addition to protecting the IGBT 22 from overvoltages, the MOV 24 accelerates the dissipation of the pickup coil's energy. The rapid dissipation of the pickup coil allows for operation of the contactor's jogging mode. The MOV 24 forces dropout during jog duty. Whenever the user jogs a motor, the pickup current may be interrupted by the user switch rather than a timer. When this occurs, the MOV 24 absorbs energy from the pickup coil 28 and causes the device to dropout faster than if the coils had to dissipate all of the stored energy.

Increasing the MOV's clamp voltage will drive the pickup current down faster and force a quicker dropout of the pickup coil 28. The reason this occurs can be explained by the following equations:

$$V_{MOV} = L \times \frac{di}{Dt} \text{(inductor)}$$

$$\frac{V_{MOV}}{L} = \frac{di_{PICKUP}}{dt}$$

The equations show how increasing the value of $V_{MOV}$ will increase the rate of decay of the pickup current (di/dt). Now that these relationships are known, the optimal value for the MOV 24 can be chosen.

The IGBT's voltage rating must be coordinated with the clamping voltage of the MOV 24. The MOV's voltage needs to be high enough so that it will not clip the AC line peaks, but it also needs to clamp the voltage at a level low enough so that the IGBT's voltage rating ($V_{CE}$) will not be exceeded. For example, the lower the MOV's clamp voltage, the more margin there is between the clamped voltage and the IGBT's voltage rating; however, the lower the MOV's clamp voltage, the larger the current spike that the MOV 24 must absorb during dropout of the contactor. Larger current spikes absorbed by the MOV 24 on a regular basis will shorten the life expectancy of the MOV 24. In addition, the IGBT's thermal impedance should be considered as well because each time the contactor turns off, there will be power dissipation. The ultimate electrical specifications for the IGBT 22 and the MOV 24 will differ from printed wire board to printed wire board to accommodate the different coil operating voltages. The 120–240 V contactor coil is discussed below for illustrative purposes.

Figure 3:
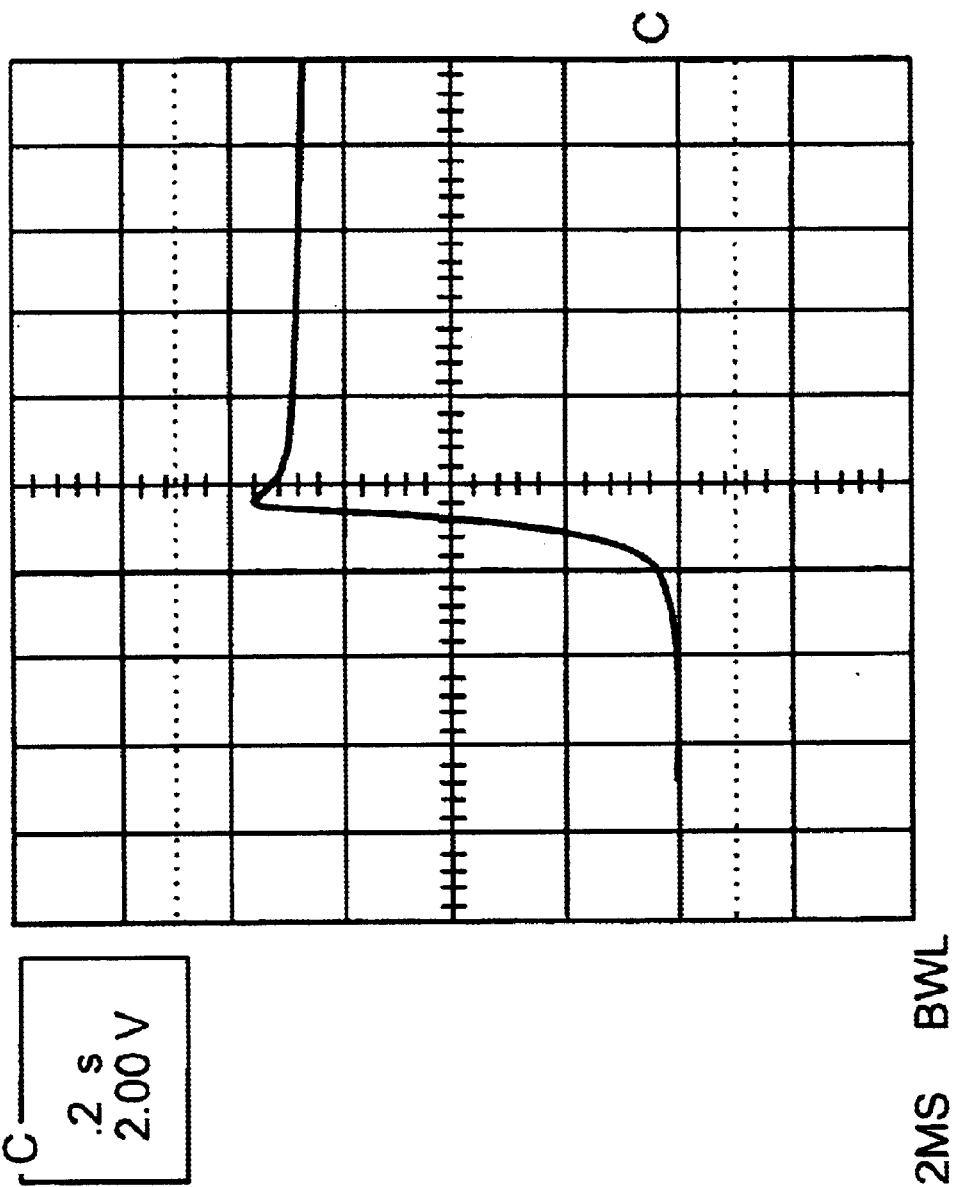
FIG. 3 is a signal trace showing the voltage clamped across the IGBT by the MOV; and, FIG. 4 is a signal trace of a current spike absorbed by the MOV after power has been interrupted to the pickup coil by the IGBT.

In selecting a MOV 24 for this application, current amplitude and duration must be considered. The MOV 24 must have a voltage rating equal to or greater than 110% of the highest main voltage used on the circuit board, i.e., a 240V board requires a MOV with a voltage rating of at least 264V. This will prevent the MOV 24 from clipping the incoming main voltage signal. An IGBT 22 is then selected for the board depending upon the level of voltage blocking desired. For this example, an IGBT 22 capable of blocking 1020V is selected.(manufactured by Toshiba, part no. GT15Q101) Preferably, the physical size of the MOV should be as small as possible to fit on the circuit board. The MOV selected can operate on line voltages up to 320VAC, which is above the required minimum value of 264V. FIG. 3 shows the clamped voltage across the MOV and the IGBT. It can be seen that the MOV 24 clamps the voltage to approximately 760V. This level allows for an approximate margin of 260V for the IGBT.

Figure 4:
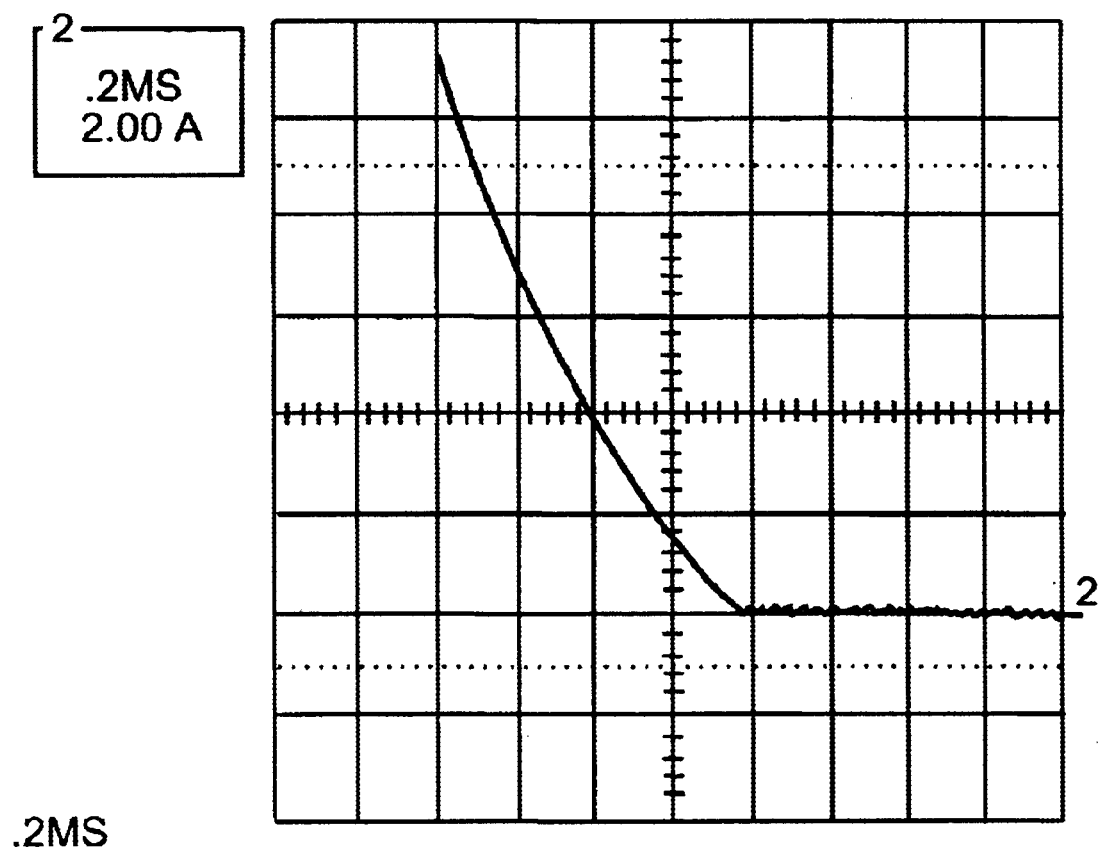

FIG. 4 shows the electrical current spike that the MOV 24 absorbs when the IGBT 22 is turned off. Many manufacturers of MOVs define current duration as the time from when the current rises to 10% of its peak value to the time it falls to 50% of its peak value. Using this definition, the duration in the current spike in FIG. 3 is approximately 250 μS. The peak current amplitude is 11.2 A. The current duration and peak amplitude can be used to determine a manufacturer's guaranteed number of operations that a MOV will withstand. According to the manufacturer's data sheet, this MOV will withstand over two million operations. This meets the requirement for the projected life of the contactor. Furthermore, the pickup coil dropout takes between 80 and 90 mS and therefore can be used for rapidly dissipating energy in repetitive operations such as the jogging mode. Thus, the selected MOV satisfies the number of operations, provides the desired amount of protection for the IGBT and facilitates the rapid dissipation of energy during dropout of the pickup coil in an acceptable time range.

While the specific embodiments have been illustrated and described, numerous modifications come to mind without significantly departing from the spirit of the invention and the scope of protection is only limited by the scope of the accompanying claims.

We claim:

1. A method of rapidly dissipating energy from a contactor in a jogging mode controlled by a switching device, the steps comprising:

operably connecting the switching device electrically in series with the contactor coil;

operably connecting a metal oxide varistor to the switching device;

periodically interrupting electrical current to the contactor during a contactor pickup time period;

absorbing energy dissipated from the contactor; and, preventing a predetermined amount of voltage from existing across the switching device.

2. The method of claim 1 wherein the switching device is a transistor.

3. The method of claim 1 wherein the switching device is an insulated gate bipolar transistor.

4. A method of rapidly dissipating energy from a contactor's pickup coil controlled by a switching device during a jogging mode, the steps comprising:

operably connecting the switching device electrically in series with the pick up coil;

operably connecting a metal oxide varistor to the switching device;

periodically interrupting electrical current to the pickup coil;

absorbing energy dissipated from the pickup coil; and, preventing a voltage across the switching device from exceeding a predetermined value.

5. The method of claim 4 wherein the switching device is a transistor.

6. The method of claim 4 wherein the switching device is an insulated gate bipolar transistor.

7. A method of rapidly dissipating energy from a contactor circuit's dual wound coil controlled by a switching device during a jogging mode, the steps comprising:

operably connecting the switching device electrically in series with a pickup coil of the dual wound coil;

operably connecting a metal oxide varistor to the switching device, said metal oxide varistor must have a voltage rating at least 110% of the highest main voltage used in the contactor circuit;

interrupting electrical current to the pickup coil of the dual wound coil;

absorbing energy dissipated from the pickup coil; and, preventing a voltage across the switching device from exceeding a predetermined value.

8. The method of claim 7 wherein the switching device is a transistor.

9. The method of claim 7 wherein the switching device is an insulated gate bipolar transistor.

10. A method of rapidly dissipating energy from a contactor in a jogging mode, the steps comprising:

connecting a metal oxide varistor electrically in parallel with a switching device, both being electrically in series with a contactor coil;

jogging the contactor by rapidly operating the switching device for a brief time period thereby rapidly energizing and de-energizing the contactor coil;

absorbing the energy dissipated from the contactor coil during each de-energizing such that contactor dropout is achieved before the next energizing is started; and, preventing a predetermined amount of voltage from existing across the switching device during each de-energizing of the contactor coil.

11. The method of claim 10 wherein the rating of the metal oxide varistor is at least 110% of the highest voltage used in the contactor coil.

12. The method of claim 10 wherein the switching device is a transistor.

13. The method of claim 10 wherein the switching device is an insulated gate bipolar transistor.

14. The method of claim 13 wherein the insulated gate bipolar transistor is selected to have a voltage rating at least above the clamping voltage of the metal oxide varistor.

15. A method of rapidly dissipating energy from a contactor pick-up coil device during a jogging mode, the steps comprising:

connecting a switching device electrically in series with the contactor pick-up coil;

connecting a metal oxide varistor of selected voltage rating electrically in parallel with the switching device;

operating the switching device in rapid succession for a brief time period thereby rapidly energizing and de-energizing the contactor pick-up coil;

absorbing energy dissipated from the contactor pick-up coil during each de-energizing such that contactor dropout is accomplished; and, preventing a predetermined amount of voltage from existing across the switching device during each de-energizing of the contactor pick-up coil.

16. The method of claim 15, wherein an optimal voltage rating for the metal oxide varistor is determined by the inductance of the pick-up coil (L) times the change in pickup-coil current (di) divided by desired time for dissipating the energy of the pickup-coil (dt).

17. The method of claim 15 wherein the switching device is a transistor.

18. The method of claim 15 wherein the switching device is an insulated gate bipolar transistor.

19. The method of claim 18 wherein the insulated gate bipolar transistor is selected to have a voltage rating at least above the clamping voltage of the selected metal oxide varistor.

* * * * *